US008925372B2

(12) United States Patent
Bent

(10) Patent No.: US 8,925,372 B2
(45) Date of Patent: Jan. 6, 2015

(54) METHOD OF TESTING A GAS INJECTOR VALVE AND A SYSTEM FOR EXERCISING THE METHOD

(71) Applicant: IOP Marine A/S, Brøndby (DK)

(72) Inventor: Kortsen Bent, Hellerup (DK)

(73) Assignee: IOP Marine A/S, Brondby (DK)

( * ) Notice: Subject to any disclaimer, the term of this patent is extended or adjusted under 35 U.S.C. 154(b) by 0 days.

(21) Appl. No.: 14/355,173

(22) PCT Filed: Nov. 5, 2012

(86) PCT No.: PCT/EP2012/004592
§ 371 (c)(1),
(2) Date: Apr. 29, 2014

(87) PCT Pub. No.: WO2013/068090
PCT Pub. Date: May 16, 2013

(65) Prior Publication Data
US 2014/0318221 A1 Oct. 30, 2014

(30) Foreign Application Priority Data
Nov. 9, 2011 (DK) ................................ 2011 00877

(51) Int. Cl.
*G01M 3/06* (2006.01)
*G01M 3/22* (2006.01)
*F02M 65/00* (2006.01)

(52) U.S. Cl.
CPC .................................. *F02M 65/006* (2013.01)
USPC .................................. 73/47; 73/40.7; 73/49.7

(58) Field of Classification Search
CPC ........................... F02M 65/006; G01M 3/2876
USPC ........................................... 73/40.7, 47, 49.7
See application file for complete search history.

(56) References Cited

U.S. PATENT DOCUMENTS 3,106,835 A * 10/1963 Henderson ........................ 73/46
3,511,082 A * 5/1970 Lathrop et al. .................... 73/46
4,559,815 A * 12/1985 Needham ................... 73/114.45
4,770,029 A * 9/1988 Webber et al. .................... 73/46
5,212,979 A * 5/1993 Albrodt et al. .................... 73/37
5,834,631 A * 11/1998 Yamaguti et al. ................. 73/40
6,311,553 B1 11/2001 Schoffel et al.

(Continued)

FOREIGN PATENT DOCUMENTS

EP 2455604 5/2012
WO WO98/24014 6/1998
WO WO2005/047690 5/2005

*Primary Examiner* — David A Rogers
(74) *Attorney, Agent, or Firm* — K. David Crockett, Esq.; Crockett & Crockett, PC

(57) ABSTRACT

Method of testing a gas injector valve for a combustion engine. The valve is placed in a holder (1) with a first chamber (2) and a second chamber (3), the valve spraying nozzle (11) being placed in the first chamber (2), after which the valve in a closed condition is influenced by a test gas under pressure to control whether the valve seat and the valve gaskets (13*a*, 13*b*) are leak proof. This method makes it possible to indicate the position of a leak if any.

5 Claims, 2 Drawing Sheets

(56) References Cited

U.S. PATENT DOCUMENTS

| | | | | |
|---|---|---|---|---|
| 6,484,573 | B2 * | 11/2002 | Bundock et al. | 73/114.48 |
| 6,532,809 | B2 * | 3/2003 | Robinson | 73/114.45 |
| 7,080,551 | B2 * | 7/2006 | Tani et al. | 73/114.52 |
| 7,316,153 | B2 * | 1/2008 | Winkler et al. | 73/40 |
| 7,878,051 | B2 * | 2/2011 | Tani et al. | 73/114.48 |
| 7,937,988 | B2 * | 5/2011 | Degler et al. | 73/49.7 |
| 7,963,149 | B2 * | 6/2011 | Maier et al. | 73/47 |
| 8,020,585 | B2 * | 9/2011 | Shock et al. | 137/613 |

* cited by examiner

METHOD OF TESTING A GAS INJECTOR VALVE AND A SYSTEM FOR EXERCISING THE METHOD

BACKGROUND OF THE INVENTION

Field of the Invention

The invention is related to a method and a system for testing a gas injection valve for a combustion engine.

WO 9824014 describes a system for testing of fuel injection valves by means of compressed air. However such a system is not sufficient for testing of gas injection valves for combustion engines in which case only small leaks are unacceptable and may result in explosions.

There exists a system for testing of gas injection valves for combustion engines. However this system is not satisfactory.

The object of the invention is to provide a method of testing gas injection valves and the method should also be able to detect even the smallest leakages. The method should also be simple.

A method of the above mentioned type is according to the invention characterized by the valve being placed in a holder having a first chamber and a second chamber, the valve spraying nozzle of the valve being placed in the first chamber and the valve in closed condition being influenced by a non-burnable test gas under pressure to check whether the valve seat and the valve gaskets are close, whereby the gas which during the supply of gas escapes at the valve seat, is detected separately eventually through a gas discharge tube, which from the first chamber is connected to a separate container with liquid, and the gas which during the supply of gas escapes as a result of leaky valve gaskets is detected separately eventually through a gas discharge tube connected to the valve, said gas discharge tube being connected to a second container with liquid.

The gas which during the supply of gas escapes as a result of leaky valve gaskets may in a special advantageous embodiment according to the invention be detected separately through channels in the valve and a gas discharge tube connected to the channels, said tube being connected to a container with liquid.

The invention is also related to a system for testing a gas injection valve for a combustion engine comprising a holder in which the valve can be placed, said holder having a first chamber and a second chamber, said system also comprises a unit for supply of sealing oil to the valve, a unit for supply of control oil to the valve, a unit for supply of test gas to the holder and units for testing the valve for leaks at the valve seat and at the valve gaskets by observing of leakages or discharges if any from the valve. As a result a very simple system for testing of gas injection valves is obtained.

The gas which during the supply of gas escapes at the valve seat, may in a special advantageous embodiment according to the invention be detected separately through a gas discharge tube connected to a separate container with liquid.

The gas which during the supply of gas escapes as a result of leaky valve gaskets, may according to the invention be detected separately through channels in the valve and a gas discharge tube connected to a separate container with liquid.

BRIEF DESCRIPTION OF THE DRAWINGS

The invention will be explained in the following with reference to the drawings in which.

DETAILED DESCRIPTION OF THE INVENTION

Gas injection valves for combustion engines have to be controlled regularly as gas leakages if any may result in escape of explosive gases.

Figure 1:
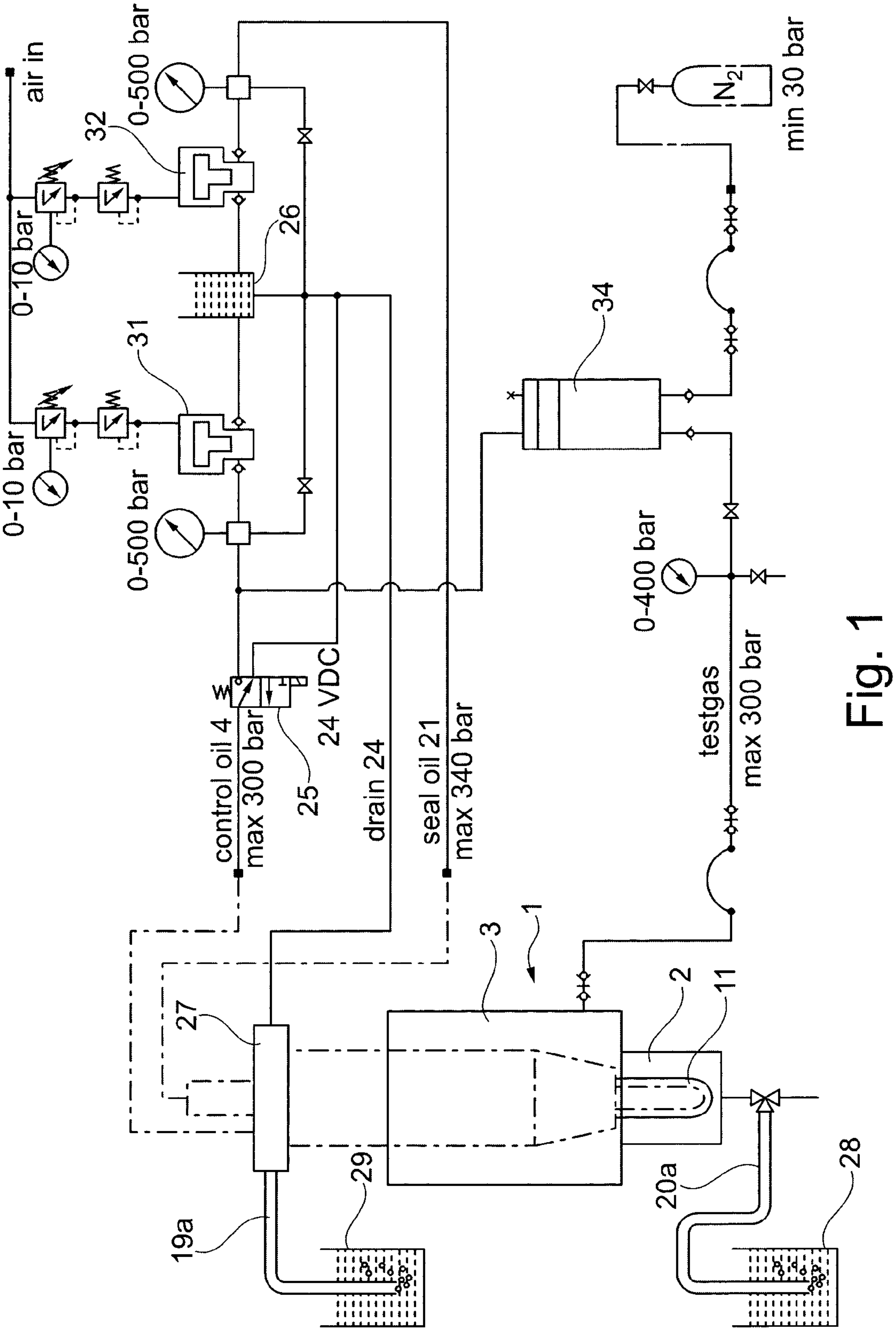
FIG. 1 illustrates the whole system according to the invention for testing of a gas injection valve FIG. 2 a holder for the gas injection valve and FIGS. 3*a* and 3*b* two elongate and in relation to each other perpendicular sectional views of the holder.
Figure 2:
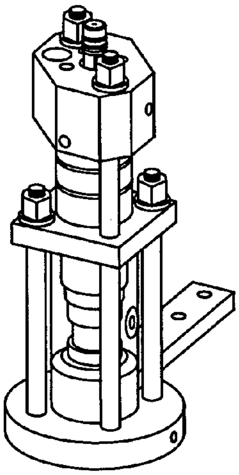
Figure 3A:
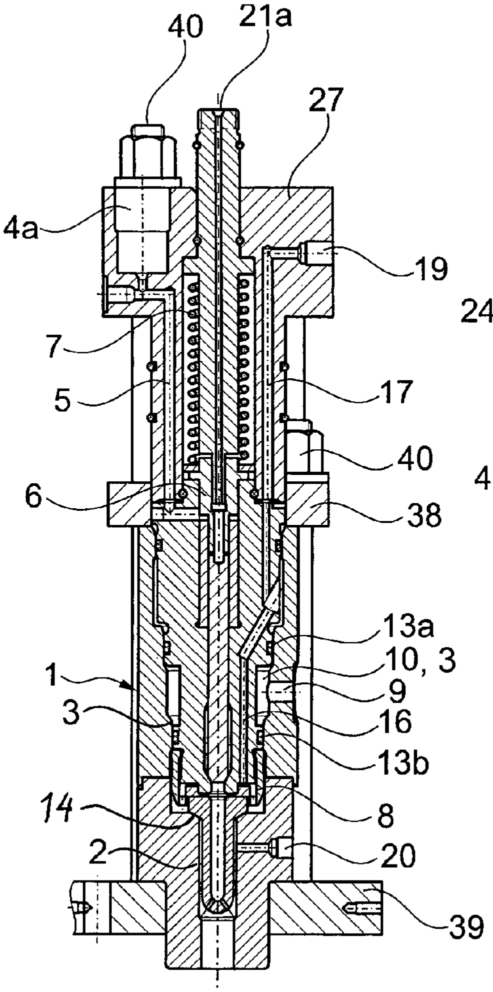
Figure 3B:
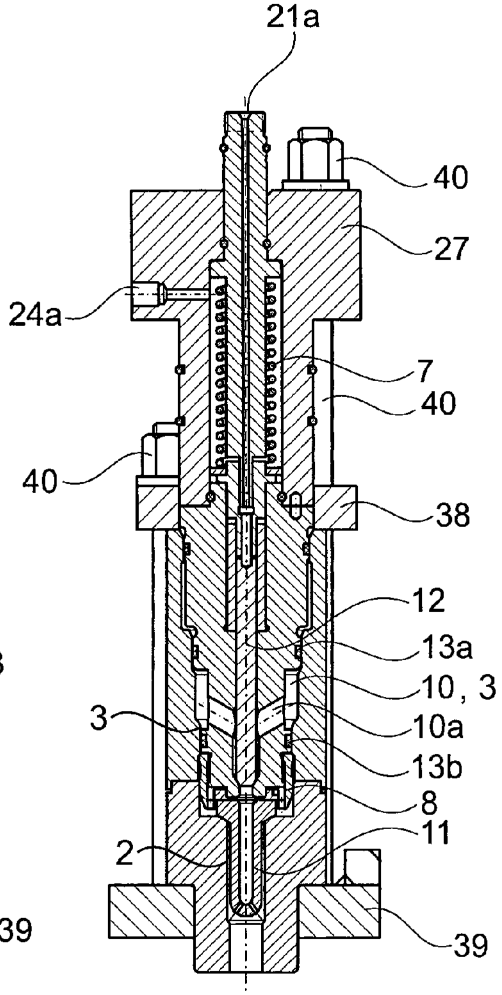

FIG. 1 illustrates a system according to the invention for testing of a gas injection valve. The system comprises a valve holder 1 to which test gas, seal oil and control oil may be supplied. The valve holder 1 and the gas injection valve placed in the valve holder 1 is illustrated in perspective view in FIG. 2 and in sectional view in FIGS. 3*a* and 3*b*. The valve holder 1 illustrated in FIG. 3*a* has a first lower chamber 2 and a second upper chamber 3. The valve placed in the holder comprises a body with a continuous opening in the longitudinal direction. A valve spraying nozzle 11 is by means of a coupling 8 with an ingoing collar mounted to the lower portion of the body. The valve spraying nozzle 11 has a bore which is connected to the through opening in the body in which opening there is a spindle guide 12 which may be lifted by means of control oil supplied through an opening 4*a*. The control, oil is under a pressure of about 300 bar. The control oil is from the opening 4*a* led through a vertical channel 5 and into a cavity which at the top is limited by a piston like body 6. This body 6 may be pressed up against an overhead compression spring 7 by supplying of the said control oil, whereby the spindle guide 12 connected to the compression spring 7 is lifted and the gas injection valve is opened. The supply of control oil is controlled by means of a sliding valve 25, conf. FIG. 1. The figure also illustrates an opening 9 in the side of the holder 1 for supplying of test gas from a gas container, typically containing N2. Other test gasses could also be used. The test gas is through a cavity 10 surrounding the body and some downward inclined channels 10*a* led to the lower portion of the spindle guide 12. At each side of the surrounding cavity 10 in upwards and downwards direction is placed a surrounding gasket 13*a*, 13*b* so as to omit unintentional leakage of pressurized gas from the surrounding cavity 10. These gaskets 13*a*, 13*b* may for instance consist of Teflon.

A leakage as a result of leaky gaskets 13*a*,13*b* causes an escape of test gas through the channels 16,17 and the opening 19. A leakage of test gas at the valve seat 14 and the valve spraying nozzle 11 causes an escape of gas at the opening 20.

The portions forming the upper chamber 3, the lower chamber 2 and the top 27 including the compression spring 7 are secured to flanges 38,39 kept together by means of bolts 40.

The placement of the valve in the holder 1 corresponds to the placement in an engine, typically a two stroke engine. The lower portion of the valve spraying nozzle 11 is freely extending when the valve is placed in an engine.

FIG. 1 illustrates the whole system for testing of a gas injection valve. It also comprises the valve holder 1 with the two chambers 2,3, a line 21 for supplying of seal oil from a tank 26 at a pressure higher than the pressure of the test gas for instance 340 bar. The seal oil is from above supplied to an opening 21*a* and the object is to secure that gas due to the high pressure does not enter the valve. Through a line 4 there is supplied control oil from the tank 26 at a pressure of for instance 300 bar to an opening 4*a* in the top 27. The supply of control oil is controlled by means of the sliding valve 25, which is electrically controlled. The reverse flow of seal oil and control oil from the opening 24*a* is through a line 24 to the tank 26, from where the oil by means of pneumatically operated pumps 31,32 is returned to the holder 1. The figure also illustrates some pressure meters.

In a special advantageous embodiment the pressure of the gas is increased to about 300 bar by means of a compressor 34 in the gas line. The said compressor 34 may at the same time be used for increasing the pressure of the control oil to substantially the same value.

A leakage of gas from the opening 20 is detected through a hose 20*a* connected to the liquid in a liquid container 28. As a result a leakage of gas could be detected by observing gas bubbles if any in the liquid in the container 28. This is a very sensitive and incredibly simple detection method.

A gas leakage from the side opening 19 due to leaky gaskets 13*a* and 13*b* is detected through a hose 19*a* connected to the opening 19, said hose being connected to the liquid in the liquid container 29. As a result a leakage of gas could be detected by observing gas bubbles if any in the liquid in the container 29. This is also a very simple and incredibly simple detection method.

A special advantage of the system according to the invention is that it is able to detect the position of the leakage.

Small drops of sealing oil will be able to escape under high pressure (300 bar) together with nitrogen if the control oil does not open at the correct pressure. If the said oil drops get into contact with oxygen the high pressure may result in a local burning. This could be avoided by cleaning the valve spraying nozzle for oxygen by applying nitrogen at a low pressure before the test of the opening of the gas injector valve.

The invention claimed is:

1. A method of testing a gas injection valve for a combustion engine, by which method the valve is placed in a holder (1) having a first chamber (2) and a second chamber (3), the valve spraying nozzle (11) of the valve being placed in the first chamber (2) and the valve in closed condition being influenced by a non-burnable test gas under pressure to check whether the valve seat and the valve gaskets (13*a*, 13*b*) are close, whereby the gas which during the supply of gas escapes at the valve seat, is detected separately eventually through a gas discharge tube (20*a*), which from the first chamber (2) is connected to a separate container (28) with liquid, and the gas which during the supply of gas escapes as a result of leaky valve gaskets (13*a*, 13*b*) is detected separately eventually through a gas discharge tube (19) connected to the valve, said gas discharge tube (19) being connected to a second container (29) with liquid.

2. The method according to claim 1 characterised in that the gas which during the supply of gas escapes as a result of leaky valve gaskets (13*a*, 13*b*) is detected separately through channels (16,17) in the valve and a to the channels connected gas discharge tube (19*a*) connected to a container (29) with liquid.

3. A system of testing a gas injector valve for a combustion engine comprising a holder (1) in which the valve can be placed, said holder having a first chamber (2) and a second chamber (3), said system also comprising a unit (32) for supply of seal oil to the valve, a unit (31) for supply of control oil to the valve, a unit for supply of test gas to the holder (1) and units for testing for leaks at the valve seat and at the valve gaskets (13*a*, 13*b*) by observing of leakages or discharges if any from the valve.

4. The system according to claim 3 characterised in that the gas which during the supply of gas escapes at the valve seat, may be detected separately through a gas discharge tube (20*a*) connected to a separate container (28) with liquid.

5. The system according to claim 3 characterised in that the gas which during the supply of gas escapes as a result of leaky valve gaskets (13*a*, 13*b*), may be detected separately through channels (16,17) in the valve and a gas discharge tube (19*a*) connected to a separate container (29) with liquid.

* * * * *